April 6, 1954     D. L. SMART ET AL     2,674,714
VAPOR-ELECTRIC DISCHARGE DEVICE FREQUENCY CONVERTER
Filed Sept. 21, 1951
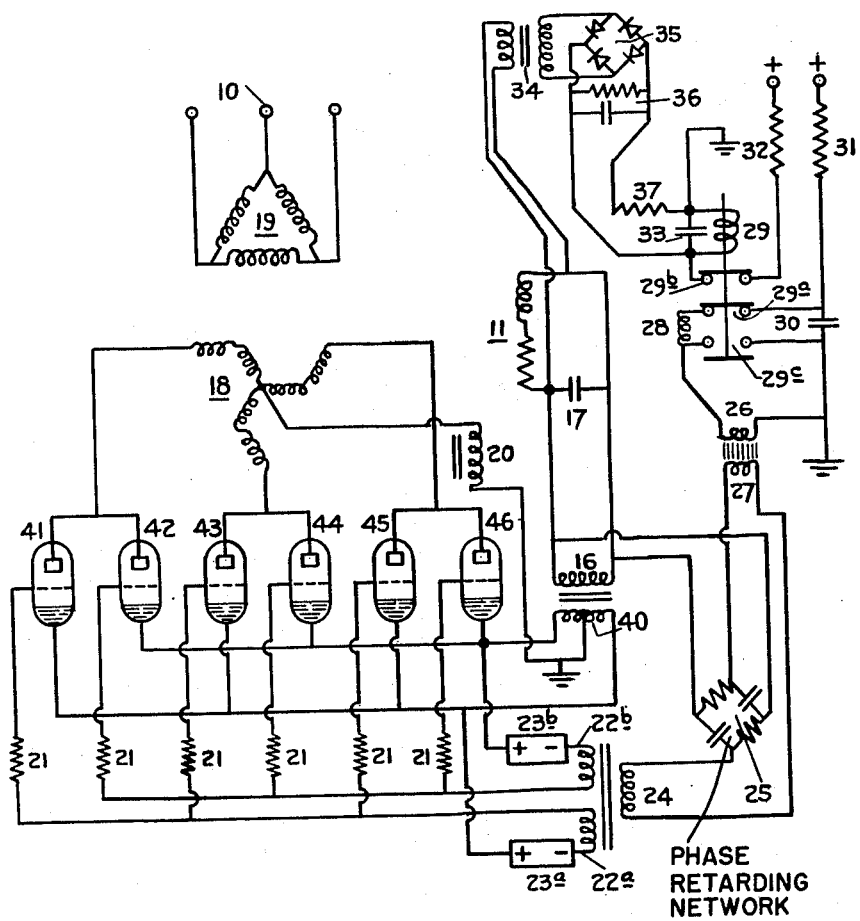
Inventors
David L. Smart
John D. McColl
By
Babcock & Babcock
Attorneys Patented Apr. 6, 1954

2,674,714

UNITED STATES PATENT OFFICE 2,674,714

VAPOR-ELECTRIC DISCHARGE DEVICE FREQUENCY CONVERTER

David Lorimer Smart and John Duncan McColl, Stafford, England, assignors to The English Electric Company Limited, London, England, a British company Application September 21, 1951, Serial No. 247,702

Claims priority, application Great Britain September 22, 1950

3 Claims. (Cl. 321—66)

This invention relates to frequency converter equipment of the type employing one or more grid-controlled vapour electric discharge tubes and which is arranged to produce alternating current output at a frequency of the order of a kilocycle per second from a supply of alternating current of a relatively low frequency. Such equipment will herein be called "frequency converter equipment of the type described."

According to the invention, a frequency converter equipment of the type described has grid control voltages fed back during normal operation from the output circuit to the control grids, and is characterized by the provision of means to inject into the circuit of the control grids a starting oscilaltion of frequency approximately equal to the normal output frequency.

The accompanying drawing shows an abridged circuit diagram which illustrates the application of the invention in preferred form.

The frequency converted equipment illustrated in the drawing draws power from a three-phase, 50-cycle supply main 10, and delivers power at a frequency of the order of a kilocycle per second to a load 11. This load 11 may be the work coil of an induction heater, and is represented as comprising inductance and resistance.

Six mercury vapour discharge tubes 41 to 46, each of the grid-controlled and pool-cathode type, are grouped in pairs. The anodes of the pair 41—42 are directly connected together and to one terminal of the star-connected secondary winding 18 of an input transformer, and similarly the anodes of the other pairs of discharge tubes are connected to the other terminals of this winding. The primary winding 19 of the input transformer is delta-connected to the supply mains 10.

The cathodes of discharge tubes 41—43—45 these being one from each pair of tubes, are connected to one end of the primary winding 40 of an output transformer, and the cathodes of the other tubes 42—44—46 are connected to the other end. The secondary winding 16 of this output transformer delivers power at output frequency to load 11, with tuning condenser 17 in parallel.

A choke coil 20 completes the circuit from the mid-point of winding 40 to the neutral point of the input transformer secondary winding 18.

The control grids of tubes 41—43—45 are connected through individual grid resistors 21 and together through a secondary winding 22a of a grid transformer and through a negative bias source 23a to the cathodes of the same tubes. Similarly the control grids of tubes 42—44—46 are connected through individual grid resistors 21 and together through another secondary winding 22b and through another negative bias source 23b to the cathodes of these tubes.

The primary winding 24 of the grid transformer is coupled through a phase-retarding network 25 across the secondary winding 16 of the output transformer. This phase-retarding network is adjusted so that appropriate positive feedback voltages are applied to the grids during normal operation to provide self-excitation.

In series with the primary winding 24 of the grid transformer there is connected the secondary winding 27 of an impulse transformer. This is a transformer in which the primary current is sufficient to saturate the core, and in which impulses of secondary voltage are generated in each half-cycle at about the time when the primary current passes through zero. The primary winding 26 of this impulse transformer is connected in series with a choke coil 28 and relay contacts 29a across a condenser 30. This condenser 30 is arranged to be charged through resistor 31 from a D. C. source when contacts 29a are opened. Choke coil 28 and condenser 30 are so proportioned that, when relay contacts 29a are reclosed, there occur in this circuit oscillations of a frequency approximately equal to the output frequency at which power is delivered into the circuit of load 11 during normal operation. In practice the frequency of these oscillations should be within the range 10% below to 25% above the normal output frequency.

The purpose of impulse transformer 26—27 is to inject an oscillatory voltage to the control grid circuit through grid transformer 24—22a—22b when it is desired to start the equipment into operation. The use of an impulse transformer 26—27 for this purpose ensures precise phasing of the impulses which are derived from the oscillations in network 28—30.

In order to ensure satisfactory starting of the apparatus, means are provided to open and reclose relay contacts 29a repeatedly until oscillations are established in the circuit of load 11. Each time that contacts 29a open, the condenser 30 recharges through resistor 31 and is made ready to generate oscillations afresh when relay contacts 29a reclose.

The repeated opening and closing of relay contacts 29a is effected by the connection of the operating coil 29 of this relay in series with another pair of its own contacts 29b, which are normally closed, and through a resistor 32 to receive current from a direct current source, and by the connection of a condenser 33 in parallel with the operating coil 29.

When oscillations are established in the circuit of load 11, the relay operating coil 29 becomes constantly energized with direct current derived from the circuit of load 11 through transformer 34, rectifier 35, filter 36 and resistor 37. Contacts 29a and 29b then remain open, and so the application of impulses through transformer 26—27 will cease so long as oscillations continue in the circuit of load 11. A further pair of contacts 29c will at the same time remain closed, and will short-circuit the primary winding 26 of the impulse transformer, thus substantially eliminating the impedance of this transformer from the circuit of the grid transformer primary winding 24 during normal operation.

The frequency converter equipment illustrated in the drawing shows a plurality of single-anode tubes, with the output winding, represented by transformer primary winding 40, connected between the cathodes of pairs of tubes. The invention is equally applicable to frequency converter equipments having the cathodes of the tubes all connected directly together and having output windings connected between anodes of pairs of tubes. With such a circuit, the discharge paths may be accommodated alternatively in a single multi-anode discharge tube with a single pool cathode.

What we claim as our invention and desire to secure by Letters Patent is:

1. A frequency converter equipment comprising an input circuit from which alternating current at a supply frequency, is received, an output circuit into which alternating current at an output frequency is delivered, a plurality of vapour electric discharge valves each having an anode, a cathode and a control electrode, the anode-cathode paths of said valves being connected in common to said input and output circuits, a feedback network from said output circuit to said control electrodes, a capacitance, an inductance which tunes with said capacitance at a frequency near to said output frequency, a direct current source, a relay having two positions and having contacts connected to said capacitance and inductance so that in the first position it connects said capacitance to be charged from said direct current source and in the second position it connects said capacitance to discharge through said inductance and into said feedback network, and means to operate said relay into said two positions alternately and repeatedly.

2. A frequency converter according to claim 1, having a holding coil upon said relay, said first position being that in which it is held when said first holding coil is energized, and a network including a rectifier connecting said holding coil to said output circuit.

3. A frequency converter equipment comprising an input circuit from which alternating current at a supply frequency is received, an output circuit into which alternating current at an output frequency is delivered, a plurality of vapour electric discharge valves each having an anode, a cathode and a control electrode, the anode-cathode paths of said valves being connected in common to said input and output circuits, a feedback network from said output circuit to said control electrodes, a capacitance, an inductance which tunes with said capacitance at a frequency near to said output frequency, a direct current source, a relay having two positions and having contacts connected to said capacitance and inductance so that in the first position it connects said capacitance to be charged from said direct current source and in the second position it connects said capacitance to discharge through said inductance and into said feedback network, means to operate said relay into said two positions alternately and repeatedly, and means responsive to voltage in said output circuit to arrest said relay in said first position.

References Cited in the file of this patent

UNITED STATES PATENTS

| Number | Name | Date |
|---|---|---|
| 1,865,428 | Bethenod | July 5, 1932 |
| 2,147,474 | Wagner | Feb. 14, 1939 |
| 2,428,332 | Johnson | Sept. 30, 1947 |
| 2,433,563 | Johnson | Dec. 30, 1947 |
| 2,490,290 | Winograd | Dec. 6, 1949 |